United States Patent
Kim

(10) Patent No.: US 9,037,378 B1
(45) Date of Patent: May 19, 2015

(54) BRAKING PRESSURE THRESHOLD LIMITING METHOD OF BRAKE TRACTION CONTROL SYSTEM

(71) Applicant: MANDO CORPORATION, Pyeongtaek-si, Gyeonggi-do (KR)

(72) Inventor: Jung Wan Kim, Suwon-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/308,588

(22) Filed: Jun. 18, 2014

(30) Foreign Application Priority Data

Nov. 11, 2013 (KR) .......................... 10-2013-0136176

(51) Int. Cl.
*B60T 8/172* (2006.01)
*B60T 8/24* (2006.01)

(52) U.S. Cl.
CPC ...................... *B60T 8/245* (2013.01)

(58) Field of Classification Search
CPC ............ B60T 8/00; B60T 8/17; B60T 8/171; B60T 8/172; B60T 8/175; B60T 8/1755; B60T 8/176; B60T 8/76; B60T 8/1761; B60T 2201/06; B60T 2201/124; B60W 10/18; B60W 10/182; B60W 10/184; B60W 10/188; B60W 30/18109; B60W 30/18172; B60W 30/184; B60W 30/186; B60W 2520/26; B60W 2520/263; B60W 2520/265; B60W 2710/18; B60W 2710/182; B60W 2710/184; B60W 2710/186; B60W 2710/188

See application file for complete search history.

(56) References Cited

U.S. PATENT DOCUMENTS

| | | | | |
|---|---|---|---|---|
| 5,774,821 A * | 6/1998 | Eckert | ............................. | 701/78 |
| 5,865,514 A * | 2/1999 | Striegel et al. | ................ | 303/149 |
| 5,984,435 A * | 11/1999 | Tsukamoto et al. | .......... | 303/191 |
| 6,045,198 A * | 4/2000 | Naito et al. | .................... | 303/154 |
| 2002/0024255 A1* | 2/2002 | Schmitt et al. | ................ | 303/139 |
| 2002/0041167 A1* | 4/2002 | Kitano et al. | ..................... | 318/3 |
| 2004/0245850 A1* | 12/2004 | Sakai | ......................... | 303/113.4 |
| 2005/0102086 A1* | 5/2005 | Nakao | ............................ | 701/80 |
| 2009/0184572 A1* | 7/2009 | Yamada et al. | ............... | 303/140 |
| 2010/0250083 A1* | 9/2010 | Takahashi et al. | ............. | 701/70 |
| 2012/0197507 A1* | 8/2012 | Custer et al. | .................... | 701/96 |
| 2013/0226429 A1* | 8/2013 | Udaka et al. | .................... | 701/73 |

* cited by examiner

*Primary Examiner* — Jerrah Edwards
*Assistant Examiner* — Tamara Weber
(74) *Attorney, Agent, or Firm* — McDermott Will & Emery LLP

(57) ABSTRACT

Disclosed is a braking pressure threshold setting method of a brake traction control system. The method includes steps of: determining whether a slip occurs in a driving wheel; initiating a BTCS control when the slip occurs in the driving wheel; determining whether instability occurs in a high-frictional driving wheel; cumulatively calculating a braking pressure applied to the low-frictional driving wheel; comparing the cumulatively calculated braking pressure value and a pre-set braking pressure threshold of the low-frictional driving wheel; and, when the cumulatively calculated braking pressure value exceeds the pre-set braking pressure threshold of the low-frictional driving wheel, setting the braking pressure applied to the low-frictional driving wheel when the slip occurs in the high-frictional driving wheel, as the threshold. Thus, it is possible to prevent the braking pressure exceeding the pre-set threshold from being applied to the low-frictional driving wheel when climbing a slope road formed with a split road surface such that a climbing performance can be improved.

7 Claims, 2 Drawing Sheets

BRAKING PRESSURE THRESHOLD LIMITING METHOD OF BRAKE TRACTION CONTROL SYSTEM

CROSS-REFERENCE TO RELATED APPLICATION

This application claims priority from and the benefit under 35 U.S.C. §119(a) of Korean Patent Application No. 10-2013-0136176, filed on Nov. 11, 2013, which is hereby incorporated by reference for all purposes as if fully set forth herein.

BACKGROUND OF THE INVENTION

1. Field of the Invention

The present invention relates to a brake traction control system, and more particularly, to a braking pressure threshold limiting method of a brake traction control system for climbing a slope, in which, in order to prevent degradation of a climbing performance of a vehicle at the time of performing a Traction Control System ("TCS") control when the vehicle is accelerated on a split road surface of the slope (a road surface on which the frictions of left and right wheels of the vehicle are different from each other), a maximum value of a braking pressure is limited to a braking pressure applied when a high-frictional driving wheel suffers from instability so that the climbing performance on the split road surface can be improved. Here, the instability refers to a phenomenon that when a low-frictional driving wheel of a vehicle slips, and a braking pressure applied to the low-frictional driving wheel is excessive, a high-frictional driving wheel, which is positioned opposite to a low-frictional driving wheel and connected to the low-frictional driving wheel via a differential gear, slips.

2. Description of the Prior Art

A vehicle brake refers to an apparatus that functions to reduce a speed of a running vehicle or to stop the vehicle.

The brake uses a hydraulic force, which is applied depending on a driver's brake pedal operating force. Through a simple method of locking a rotating vehicle wheel not to rotate, such a brake may not implement an optimum braking performance according to a travel condition of the vehicle and a condition of a road surface. In order to overcome such a limit of the brake system, an Anti-Lock Brake System ("ABS") configured to properly control a braking pressure applied to a wheel depending on a slip rate calculated based on a wheel speed so as to prevent the wheel from being locked, or a Traction Control System ("TCS") configured to control a driving force of an engine so as to prevent an excessive slip at a time of sudden unintended acceleration or sudden acceleration is used to improve the stability of the vehicle. Here, such a TCS is disclosed in Korean Patent Laid-Open Publication No. 2003-0093457.

Further, a Brake Traction Control System ("BTCS") has been proposed in which the BTCS performs a control to prevent a slip phenomenon between wheels and a road surface when the vehicle starts so that the vehicle can smoothly start.

The BTCS control is performed when the vehicle is accelerated on a split road surface in which the frictional forces of left and right road surfaces are different from each other (a road surface on which a difference in frictional coefficient is large between the wheels of the both side of the vehicle). At this time, when the braking pressure applied to a slipping wheel is excessive, the torque of a low-frictional (low-u) driving wheel is transmitted to an opposite side high-frictional (high-u) driving wheel connected thereto via a differential apparatus, thereby causing the high-frictional driving wheel to spin. Thus, the yaw motion of the vehicle suddenly deteriorates such that a vehicle behavior desired by the driver cannot be achieved. At this time, the instability of the high-frictional driving wheel is rapidly sensed to perform a control so as to reduce the excessive braking pressure of the spinning low-frictional driving wheel.

However, when the braking pressure applied to the slipping low-frictional driving force is excessive while climbing an uphill road, on which a split road surface is formed, such as a slope, the high-frictional driving wheel becomes unstable. At this time, a controller of the BTCS applies a consistent pressure depending on a spin amount so as to adjust the spin occurring in the low-frictional driving wheel to a target spin amount. Thus, the continuous unstable state of the high-frictional driving wheel consistently occurs and makes the climbing of the vehicle difficult.

PRIOR ART DOCUMENT

Patent Document

Korean Patent Laid-Open Publication No. 2003-0093457

SUMMARY OF THE INVENTION

Accordingly, the present invention has been made so as to solve the problems in the prior art as described above, and an object of the present invention is to provide a breaking pressure threshold limiting method of a BTCS which is capable of suppressing unnecessary increase of a braking pressure of a low-frictional wheel of a vehicle when the vehicle is accelerated on a split road surface so at to prevent degradation of a climbing performance due to consistent occurrence of instability of a high-frictional wheel of the vehicle.

In order to achieve the above-described object of the present invention, there is provided A braking pressure threshold setting method of a brake traction control system. The method includes: a driving wheel slip determination step of determining whether a slip occurs in a driving wheel by detecting the slip of the driving wheel; a Brake Traction Control System ("BTCS") control determination step of determining whether a BTCS control of a low-frictional driving wheel is being performed after the driving wheel slip determination step; a high-frictional driving wheel's instability determination step of determining whether instability occurs in a high-frictional driving wheel by detecting the slip in the high-frictional driving wheel during the BTCS control; a breaking pressure cumulative-calculation step of consistently and cumulatively calculating a braking pressure applied to the low-frictional driving wheel for a predetermined period when the instability occurs in the high-frictional driving wheel; a comparison step of comparing the consistently and cumulatively calculated breaking pressure value with a pre-set braking pressure threshold of the low-frictional driving wheel; and a step of setting, when the cumulatively calculated braking pressure value exceeds the pre-set braking pressure threshold of the low-frictional driving wheel, the braking pressure, which is applied to the low-frictional driving wheel when the slip occurs in the high-frictional driving wheel, as a low-frictional driving wheel braking pressure threshold stored as a low-frictional driving wheel brake control value.

In the driving wheel slip determination step, after detecting a slip in the driving wheel and a slip in a non-driving wheel, it may be determined that the slip occurs in the driving wheel when the slip in the driving wheel exceeds the slip in the non-driving wheel.

The BTCS control determination step may include: a braking pressure generation step of generating the braking pressure by operating a traction control valve; a step of initiating the BTCS control by applying the braking pressure generated in the braking pressure generation step to the low-frictional driving wheel.

The BTCS control determination step may further include a step of initializing the cumulatively calculated braking pressure value after the braking pressure is generated by controlling the traction control valve when the slip is detected in the low-frictional driving wheel and before the braking pressure is applied to the low-frictional driving wheel.

The high-frictional driving wheel's instability determination step may further include a step of storing the braking pressure applied to the low-frictional driving wheel in an electronic control unit when the slip is detected in the high-frictional driving wheel.

In the braking pressure cumulative-calculation step, the braking pressure applied to the low-frictional driving wheel may be consistently and cumulatively calculated until the BTCS control is terminated from a time when the instability of the high-frictional driving wheel occurs while the BTCS control is performed.

In the comparison step, the cumulatively calculated braking pressure value and the pre-set braking pressure threshold of the low-frictional driving wheel are compared with each other until the consistently and cumulated braking pressure value exceeds the pre-set braking pressure threshold of the low-frictional driving wheel.

According to the present invention, when performing a BTCS control, a braking pressure until instability of a high-frictional driving wheel occurs is cumulatively calculated to prevent the braking pressure from being applied to exceed a threshold set to a low-frictional driving wheel when a vehicle climbs a hill road having a split road surface. As a result, the climbing performance can be improved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
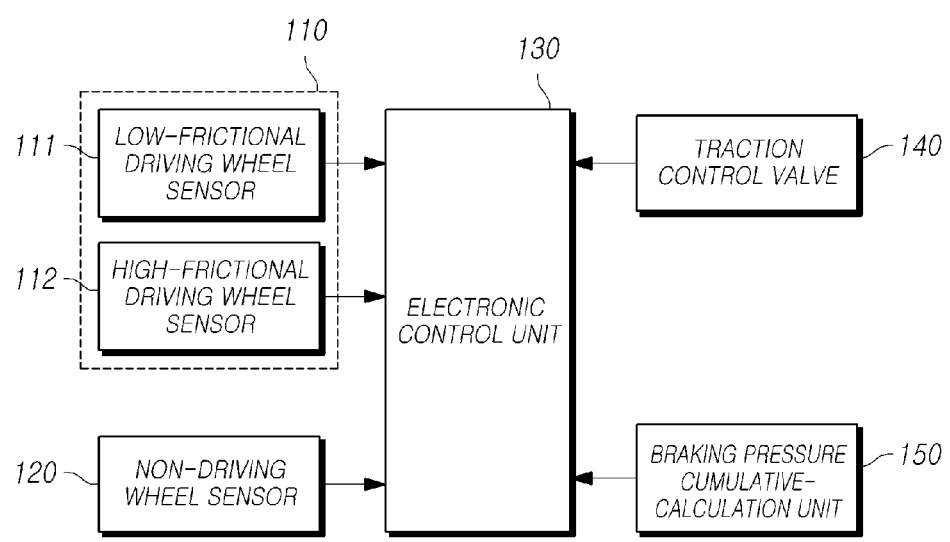
FIG. 1 is a block diagram illustrating a brake traction control system according to an exemplary embodiment of the present invention.

Specific exemplary embodiments of the present invention will be described with reference to accompanying drawings. In the process, thicknesses of lines and sizes of constituent elements shown in the drawings may be exaggerated for clearness and convenience of description thereof. The following terms are defined in consideration of their functions in the present invention, and may be changed according to an intention or customs of a user or a manager. Therefore, the definitions of the terms should be made based on the contents over the entire specification.

Figure 2:
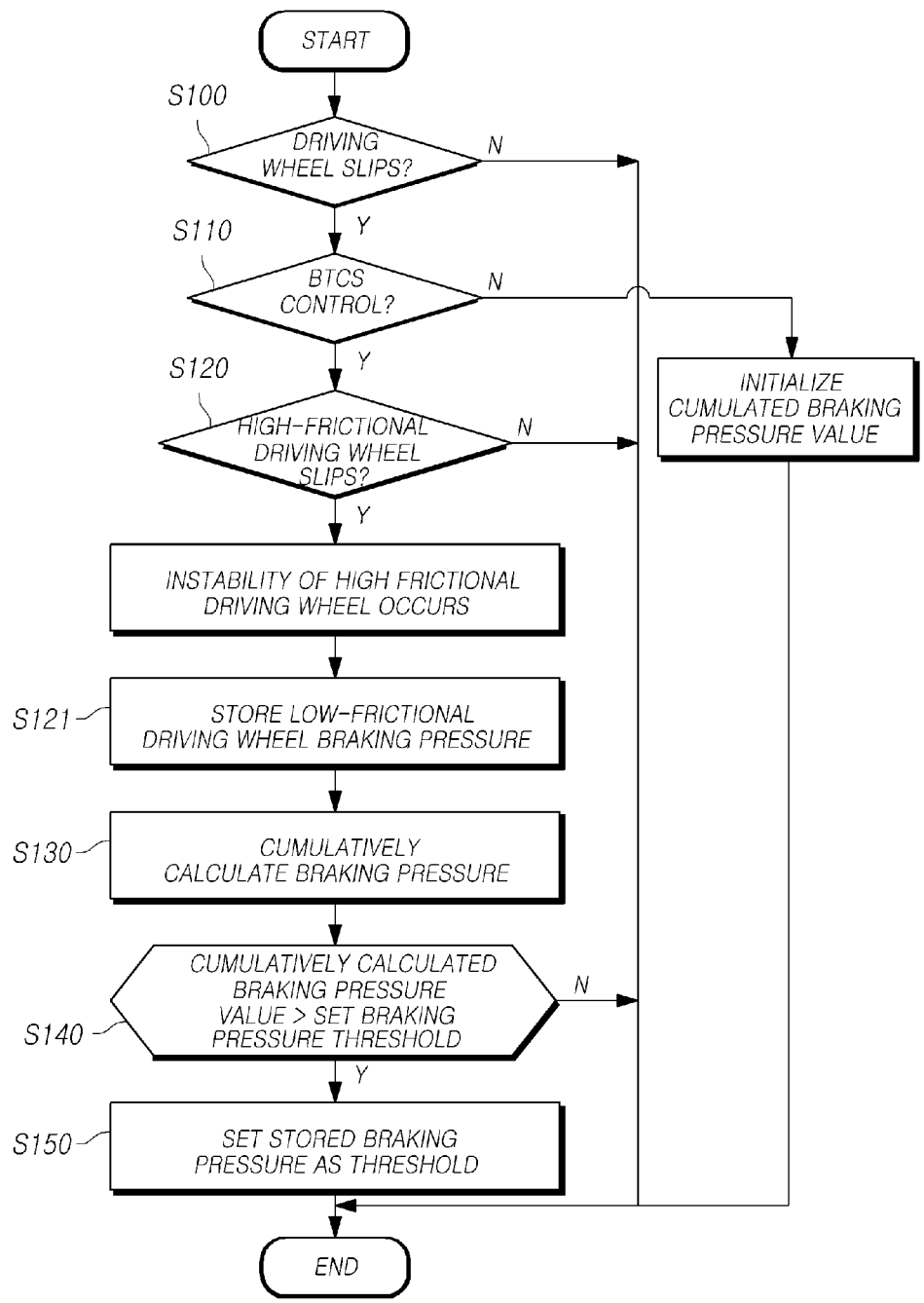
FIG. 2 is a flowchart illustrating a braking pressure threshold limiting method of a brake traction control system according to an exemplary embodiment of the present invention.

For reference, FIG. 1 is a block diagram illustrating a brake traction control system according to an exemplary embodiment of the present invention, and FIG. 2 is a flowchart illustrating a braking pressure threshold limiting method of a brake traction control system according to an exemplary embodiment of the present invention.

A braking pressure threshold setting system of a Brake Traction Control System ("BTCS") is configured to set a braking pressure threshold applied to a low-frictional driving wheel of a vehicle when a slip occurs in a high-frictional (high-u) driving wheel of the vehicle during a BTCS control of the low-frictional driving wheel after the BCTS control of the low-frictional driving wheel is initiated due to the occurrence of a slip in the low frictional (low-u) driving wheel when the vehicle is accelerated on a split road surface. The braking pressure threshold setting system includes a driving wheel sensor 110, a non-driving wheel sensor 120, an electronic control unit 130, a traction control valve 140, and a braking pressure cumulative-calculation unit 150.

The driving wheel sensor 100 refers to a sensor provided on a driving wheel, to which a power of an engine is transmitted, to serve to detect a wheel speed of the driving wheel. The driving wheel sensor 110 includes a low-frictional driving wheel sensor 111 configured to detect a slip of a low-frictional driving wheel when the vehicle is accelerated on a split road surface, and a high-frictional driving wheel sensor 112 configured to detect a slip of a high-frictional driving wheel.

Here, non-driving wheel sensor 120 is provided on a non-driving wheel, to which no power is transmitted, to detect a wheel speed of the non-driving wheel. The wheel speed of the non-driving wheel detected by the non-driving wheel sensor 120 is compared with the wheel speed of the driving wheel to serve as a reference for detecting the slip occurring in the driving wheel.

The electronic control unit 130 receives an input of a wheel speed from each of the non-driving wheel sensor 120 and the driving wheel sensor 110, and compares the non-driving wheel sensor 120 and the driving wheel sensor 110 so as to determine whether a slip occurs in the driving wheel sensor 110. At this time, the electronic control unit 130 also determines a driving wheel in which the slip occurs among the low-frictional driving wheel and the high-frictional driving wheel.

Thereafter, when it is determined that the slip occurs in the low-frictional driving wheel among the driving wheels, the electronic control unit 130 controls the traction control valve 140 to generate a braking pressure, and then consistently applies the braking pressure to the low-frictional driving wheel.

The braking pressure cumulative-calculation unit 150 serves to cumulatively calculate the braking pressure applied to the low-frictional driving wheel for a predetermined period from a time when the slip occurs in the high-frictional driving wheel after the braking pressure has been applied to the low-frictional driving wheel.

According to an exemplary embodiment of the present invention, a braking pressure threshold limiting method of a brake traction control system includes a slip determination step of determining whether a slip occurs in the driving wheel when a vehicle travels or is accelerated (S100).

In the slip determination step (S100), a present wheel speed of a driving wheel and a reference wheel speed of a non-driving wheel are compared to each other, and when the current wheel speed of the driving wheel is higher than the reference wheel speed of the non-driving wheel, it is determined that a slip occurs in the driving wheel. That is, the driving wheel sensor 110 and the non-driving wheel sensor 120 detect the wheel speeds of the driving wheel and the non-driving wheel, respectively, and transmit the detected wheel speeds to the electronic control unit 130. Then, the electronic control unit 130 compares the wheel speed of the driving wheel and the wheel speed of the non-driving wheel and then determine whether the slip occurs in the driving wheel.

After the slip determination step (S100), the braking pressure threshold limiting method includes a BTCS control determination step of determining whether the low-frictional driving wheel is being subjected to a BTCS control (S110).

The BTCS control determination step (S110) includes a braking pressure generation step of generating a braking pressure by operating the traction control valve 140 by the electronic control unit 130, and a control initiation step of initiating the BTCS control by applying the braking pressure to the low-frictional driving wheel.

Here, in the braking pressure generation step, when it is determined that the slip occurs in the low-frictional driving wheel, the electronic control unit 130 operates the traction control valve 140 so as to generate the braking pressure applied to the low-frictional driving wheel.

Thereafter, when the braking pressure is generated by the traction control valve 140, the braking pressure is applied to the low-frictional driving wheel so as to perform the BTCS control.

The BTCS control determination step (S110) further includes a step of initializing the cumulatively calculated braking pressure value before the braking pressure is applied to the low-frictional driving wheel by detecting the slip in the low-frictional driving wheel and then controlling the traction control valve 140 to generate the braking pressure.

Here, when the BTCS control is not being performed in the BTCS control determination step (S110), that is, before the BTCS control is initiated by controlling the traction control valve 140 for the BITS control to generate the braking force when the slip has been detected in the low-frictional driving wheel and applying the braking pressure to low-frictional driving wheel, the BTCS control determination step (S110) includes a step of initializing a cumulatively calculated braking pressure value.

After the BTCS control determination step (S110), the braking pressure threshold limiting method includes a high-frictional driving wheel's instability determination step of determining whether instability occurs in the high-frictional driving wheel by detecting the occurrence of the slip in the high-frictional driving wheel while the BTCS control is being performed to consistently apply the braking pressure to the low-frictional driving wheel (S120).

In the high-frictional driving wheel's instability determination step (S120), when the braking pressure increases in the low-frictional driving wheel during the BTCS control, a slip occurs in the high-frictional driving wheel. When the slip of the high-frictional driving wheel is detected, it is determined that instability occurs in the high-frictional driving wheel.

The high-frictional driving wheel's instability determination step (S120) further includes a braking pressure storage step of storing the braking pressure, which is applied to the low-frictional driving wheel when the slip of the high-frictional driving wheel is detected, in the electronic control unit 130 (S121).

When the braking pressure is excessively applied to the lower-frictional driving wheel, a slip occurs in the high-frictional driving wheel. In the he braking pressure storage step (S121), the braking pressure applied to the low-frictional driving wheel at the time when the slip occurs in the high-frictional driving wheel is stored.

Thereafter, the braking pressure threshold limiting method includes a braking pressure accumulative-calculation step of cumulatively calculating the braking pressure applied to the low-frictional driving wheel for a predetermined length of time (S130).

In the braking pressure cumulative-calculation step (S130), the braking pressure is consistently calculated until the BTCS control is terminated from the time of initiating the BTCS control to apply the braking pressure to the low-frictional driving wheel and to determine the instability of the high-frictional driving wheel. In addition, when additional instability of the high-frictional driving wheel is detected, the cumulatively calculated braking pressure value is initialized and then the braking pressure is cumulatively calculated again so as to cumulatively calculate the braking pressure applied to the low-frictional driving wheel.

Thereafter, the braking pressure threshold limiting method includes a step of comparing the cumulatively calculated braking pressure value with a pre-set braking pressure threshold (S140).

Here, the pre-set braking pressure threshold is obtained through a BCTS control test performed on a road surface set to have a condition which is the same as the condition when a spin occurs in the high-frictional driving wheel due to an excessive braking pressure applied to the low-frictional driving wheel at the time of BTCS control. When the test, in which the braking pressure applied to the low-frictional driving wheel when performing the BTCS control is cumulatively calculated, is repeatedly performed, an optimized braking pressure threshold may be obtained.

In the step of comparing the cumulated braking pressure value and the pre-set braking pressure threshold (S140), the cumulated value of the braking pressure applied to the low-frictional driving wheel after the slip has occurred in the high-frictional driving wheel is consistently compared to the pre-set braking pressure threshold of the low-frictional driving wheel.

That is, the electronic control unit compares the cumulated value of the braking pressure to the pre-set of the braking pressure threshold of the low-frictional driving wheel until the consistently and cumulatively calculated braking pressure value exceeds the pre-set braking pressure threshold of the low-frictional driving wheel.

Thereafter, when the consistently and cumulatively calculated braking pressure value exceeds the pre-set braking pressure threshold, the braking pressure threshold limiting method includes a step of setting the braking pressure, which is applied to the low-frictional driving wheel when an instable state occurs since the slip occurs in the high-frictional driving wheel due to the excessive braking pressure applied to the low-frictional driving wheel at the time of BTCS control, as the braking pressure threshold (S150).

Then, the electronic control unit 130 sets the braking pressure, which was applied to the low-frictional driving wheel at the time when the slip occurred in the high-frictional driving wheel at the time when the braking control amount cumulatively calculated from the time when the slip occurred in the high-frictional driving wheel becomes larger than the pre-set braking pressure reference value, as the braking pressure applied to the low-frictional driving wheel.

Now, a brief description will be made on actions in the braking pressure threshold setting method of the brake traction control system according to the exemplary embodiment of the present invention as described above.

First, when a slip occurs while the vehicle is accelerated in an upwardly inclined place where a split road surface is provided, a BTCS control is initiated by the electronic control unit 130.

At this time, the electronic control unit 130 controls the traction control valve 140 to consistently apply a braking pressure to the low-frictional driving wheel. At this time, the electronic control unit 130 gradually increases the braking pressure applied to the low-frictional driving wheel.

When the breaking pressure applied to the low-frictional driving wheel as described above becomes excessive, a slip occurs in the high-frictional driving wheel. When the slip is detected in the high-frictional driving wheel, the braking pressure applied to the low-frictional driving wheel is stored in the electronic control unit 130.

The electronic control unit 130 calculates the braking pressure applied to the low-frictional driving wheel until the BTCS control is terminated from the time of determining the instability of the high-frictional driving wheel. In addition, when it is determined that there is additional instability in the high-frictional driving wheel, the electronic control unit 130 initializes the calculated amount and cumulatively calculates the braking pressure applied to the low-frictional driving wheel again.

Then, the electronic control unit 130 compares the cumulatively calculated braking pressure applied to the low-frictional driving wheel and the pre-set threshold of the low-frictional driving wheel, and then, when the cumulatively calculated braking pressure exceeds the pre-set threshold of the braking pressure, the electronic control unit 130 sets the braking pressure stored when the slip occurred in the high-frictional driving wheel as the threshold of the braking pressure.

As described above, when a BTCS control is initiated at the time of climbing a slope road formed with a split road surface, and instability occurs since a high-frictional driving wheel slips during the BTCS control, the braking pressure of the low-frictional driving wheel is stored, and the braking pressure applied to the low-frictional driving wheel from the time when the instability of the high-frictional driving wheel is detected to the time when the BTCS control is terminated is cumulatively calculated. Then, when the cumulatively calculated braking pressure value of the low-frictional driving wheel exceeds the pre-set braking pressure threshold, the stored braking pressure is set as the braking pressure threshold of the low-frictional driving wheel. As a result, the climbing performance on the split road surface can be improved.

As described above, although the present invention has been described above with reference to the embodiments illustrated in the accompanying drawings, it can be understood by one skilled in the art that the described embodiments are only examples and various modifications and equivalent embodiments can be made from the described embodiments. Therefore, the actual technical scope of the present invention to be protected should be determined by the claims as set forth below.

What is claimed is:

1. A braking pressure threshold setting method of a brake traction control system, the method comprising:
    a driving wheel slip determination step of determining whether a slip occurs in a driving wheel by detecting the slip of the driving wheel;
    a Brake Traction Control System ("BTCS") control determination step of determining whether a BTCS control of a low-frictional driving wheel is being performed after the driving wheel slip determination step;
    a high-frictional driving wheel's instability determination step of determining whether instability occurs in a high-frictional driving wheel by detecting the slip in the high-frictional driving wheel during the BTCS control;
    a breaking pressure cumulative-calculation step of consistently and cumulatively calculating a braking pressure applied to the low-frictional driving wheel for a predetermined period when the instability occurs in the high-frictional driving wheel;
    a comparison step of comparing the consistently and cumulatively calculated breaking pressure value with a pre-set braking pressure threshold of the low-frictional driving wheel; and
    a step of setting, when the cumulatively calculated braking pressure value exceeds the pre-set braking pressure threshold of the low-frictional driving wheel, the braking pressure, which is applied to the low-frictional driving wheel when the slip occurs in the high-frictional driving wheel, as a low-frictional driving wheel braking pressure threshold stored as a low-frictional driving wheel brake control value.

2. The method of claim 1, wherein, in the driving wheel slip determination step, after detecting a slip in the driving wheel and a slip in a non-driving wheel, it is determined that the slip occurs in the driving wheel when the slip in the driving wheel exceeds the slip in the non-driving wheel.

3. The method of claim 1, wherein the BTCS control determination step includes:
    a braking pressure generation step of generating the braking pressure by operating a traction control valve; and
    a step of initiating the BTCS control by applying the braking pressure generated in the braking pressure generation step to the low-frictional driving wheel.

4. The method of claim 3, wherein the BTCS control determination step further includes:
    a step of initializing the cumulatively calculated braking pressure value after the braking pressure is generated by controlling the traction control valve when the slip is detected in the low-frictional driving wheel and before the braking pressure is applied to the low-frictional driving wheel.

5. The method of claim 1, wherein the high-frictional driving wheel's instability determination step further includes:
    a step of storing the braking pressure applied to the low-frictional driving wheel in an electronic control unit when the slip is detected in the high-frictional driving wheel.

6. The method of claim 1, wherein, in the braking pressure cumulative-calculation step, the braking pressure applied to the low-frictional driving wheel is consistently and cumulatively calculated until the BTCS control is terminated from a time when the instability of the high-frictional driving wheel occurs while the BTCS control is performed.

7. The method of claim 1, wherein in the comparison step, the cumulatively calculated braking pressure value and the pre-set braking pressure threshold of the low-frictional driving wheel are compared with each other until the consistently and cumulated braking pressure value exceeds the pre-set braking pressure threshold of the low-frictional driving wheel.

* * * * *